US008317091B2

(12) United States Patent
Kochiwa et al.

(10) Patent No.: US 8,317,091 B2
(45) Date of Patent: Nov. 27, 2012

(54) SHEET PROCESSING APPARATUS AND SHEET PROCESSING METHOD

(75) Inventors: Masahito Kochiwa, Yokoyama (JP); Teruhiko Uno, Mitaka (JP); Mitsuo Ichimura, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 108 days.

(21) Appl. No.: 12/850,731

(22) Filed: Aug. 5, 2010

(65) Prior Publication Data

US 2011/0054670 A1 Mar. 3, 2011

Related U.S. Application Data

(63) Continuation of application No. PCT/JP2009/051986, filed on Feb. 5, 2009.

(30) Foreign Application Priority Data

Feb. 5, 2008 (JP) ................................ 2008-024728

(51) Int. Cl.
*G06Q 40/00* (2012.01)

(52) U.S. Cl. ....................................................... 235/379

(58) Field of Classification Search .................. 235/379; 209/534, 567, 569

See application file for complete search history.

(56) References Cited

U.S. PATENT DOCUMENTS

| | | | | |
|---|---|---|---|---|
| 5,230,653 | A * | 7/1993 | Shinozaki et al. | 453/4 |
| 5,430,664 | A * | 7/1995 | Cargill et al. | 194/207 |
| 6,886,680 | B2 * | 5/2005 | King | 194/207 |
| 2007/0000819 | A1 * | 1/2007 | Yui | 209/534 |

FOREIGN PATENT DOCUMENTS

| | | |
|---|---|---|
| JP | 59-52394 | 3/1984 |
| JP | 63-255792 | 10/1988 |
| JP | 2003-242549 | 8/2003 |
| JP | 2005-107686 | 4/2005 |
| JP | 2007-087219 | 4/2007 |
| WO | WO 2005/124701 | 12/2005 |

OTHER PUBLICATIONS

International Search Report for PCT/JP2009/051986.

European Search Report dated Jul. 19, 2011.

* cited by examiner

*Primary Examiner* — Ahshik Kim

(74) *Attorney, Agent, or Firm* — Pillsbury Winthrop Shaw Pittman, LLP

(57) ABSTRACT

A sheet processing machine transmits information indicating a degree of contamination or damage for each sheet detected by a discrimination unit to a teller PC as a discrimination result. The teller PC saves the discrimination result received from the sheet processing machine in a data storage unit. A CPU of the teller PC decides reference levels that can attain good bill ratio designated by the user for respective items required to discriminate good/bad states of a sheet based on the previous discrimination results saved in the data storage unit. The CPU of the teller PC sets the reference levels that can attain the good bill ratio designated by the user in the discrimination unit of the sheet processing machine. The discrimination unit set with such reference levels discriminates good/bad states of sheets based on the reference levels set by the teller PC.

11 Claims, 10 Drawing Sheets

Update of good/bad level and notification to discrimination unit

| Denomination | Level before setting change | | Level after setting change | |
|---|---|---|---|---|
| | Contamination | Blurring | Contamination | Blurring |
| A | 5 | 5 | 7 | 7 |
| B | 5 | 5 | 5 | 5 |
| C | 5 | 5 | 5 | 5 |
| D | 5 | 5 | 5 | 5 |
| E | 5 | 5 | 5 | 5 |
| F | 5 | 5 | 5 | 5 |
| G | 5 | 5 | 5 | 5 |

FIG. 13

| | Item | Total | Shape | Tape | Blurring | Contamination | Remarks |
|---|---|---|---|---|---|---|---|
| Pattern 1 (individual setting) | Bad bill ratio | - | 1% | 1% | 10% | 30% | Total bad bill ratio is indeterminate |

FIG. 14

| | Item | Total | Shape | Tape | Blurring | Contamination | Remarks |
|---|---|---|---|---|---|---|---|
| Pattern 2 (total evaluation) | Bad bill ratio | 30% | 1% | 1% | 10% | 18%~30% | Priority levels are assigned to bad bill factors. Bad bill ratio for contamination is controlled to attain total = 30%. |
| | Priority level | | 1 | 1 | 2 | 3 | |

FIG. 15

| | Item | Total | Shape | Tape | Blurring | Contamination | Remarks |
|---|---|---|---|---|---|---|---|
| Pattern 3 (use good bills for ATM) | Bad bill ratio | 70% | 5% | 5% | 20% | 40%~70% | In order to load bills in ATM, exclusion ratios of shape, tape, and blurring are raised. |
| | Priority level | | 1 | 1 | 2 | 3 | |

FIG. 16

| Pattern 4 | Item | Total | Shape | Tape | Blurring | Contamination | Remarks |
|---|---|---|---|---|---|---|---|
| (total evaluation) | Bad bill ratio | 30% | - | - | - | ~30% | Determination criteria of shape, tape, and blurring are fixed |

FIG. 17

SHEET PROCESSING APPARATUS AND SHEET PROCESSING METHOD

CROSS-REFERENCE TO RELATED APPLICATIONS

This is a Continuation Application of PCT Application No. PCT/JP2009/051986, filed Feb. 5, 2009, which was published under PCT Article 21(2) in Japanese.

This application is based upon and claims the benefit of priority from Japanese Patent Application No. 2008-024728, filed Feb. 5, 2008; the entire contents of which are incorporated herein by reference.

FIELD

Embodiments described herein relate generally to a sheet processing apparatus and sheet processing method, which discriminate sheets according to, for example, their degrees of contamination or damage.

BACKGROUND

A sheet processing apparatus discriminates denominations, authenticities (authentic or counterfeit bills), and good/bad states (good bills as reusable banknotes or bad bills as non-reusable banknotes) in association with sheets. The sheet processing apparatus sorts sheets based on these discrimination results. It is not easy for a sheet processing apparatus of this type to set reference values (reference levels) required to discriminate sheets into good and bad bills according to their degrees of contamination or damage. This is because the required reference levels are different for users or the states of sheets to be processed are different depending on operation forms. For example, when a user requests (designates) a ratio between good and bad bills (good/bad bill ratio) as the processing result, the sheet processing apparatus has to set reference levels that can attain the good/bad bill ratio requested by the user. For example, Jpn. Pat. Appln. KOKAI Publication No. 2007-87219 describes a method of discriminating good or bad states of sheets based on the good/bad bill ratio.

However, the reference levels that can attain the desired good/bad bill ratio largely vary depending on states of sheets to be processed (i.e., operation forms). For this reason, it is difficult to uniformly provide, from the manufacturer side of the sheet processing apparatus, settings of reference values (reference values) that can attain a good/bad bill ratio requested by the user. Therefore, in the conventional sheet processing apparatus, an operator or service person sets reference levels to attain a desired good/bad bill ratio over a long period of time with reference to the actual processing results of a large number of sheets. Such operations require human skills and labor hours. That is, a conventional sheet processing system suffers a problem that it is not easy to set optimal reference levels required to determine good or bad states according to the actual operation form and a user's request.

BRIEF DESCRIPTION OF THE DRAWINGS

FIG. 13 is a table showing an example of data notified to the discrimination unit when a reference level for contamination and that for blurring are changed;

FIG. 14 is a table showing a setting example (first setting example) when bad bill ratios are individually set for a plurality of detection items;

FIG. 15 is a table showing a setting example (second setting example) when bad bill ratios are set for a plurality of detection items assigned priority levels;

FIG. 16 is a table showing a setting example (third setting example) when bad bill ratios are set for a plurality of detection items assigned priority levels; and FIG. 17 is a table showing a setting example (fourth setting example) of one or a plurality of detection items, reference levels of which are fixed, and a detection item, a bad bill ratio of which is set.

DETAILED DESCRIPTION

In general, according to one embodiment, a sheet processing apparatus is an apparatus for executing sorting processing of sheets, comprising: a data storage unit which stores data indicating a ratio of good bills or bad bills with respect to a reference value used to discriminate whether a sheet is a good bill or a bad fill; a decision unit which decides, when the ratio of good bills or bad bills is designated, a reference value which attains the designated ratio based on the data stored in the data storage unit; a pick-up unit which sequentially picks up sheets set in a feeder unit; a convey unit which conveys the sheet picked up by the pick-up unit; a discrimination unit which detects a degree of contamination/damage on the sheet conveyed by the convey unit, and discriminates whether the sheet is a good bill or a bad bill by comparing the detected degree of contamination/damage with the reference value decided by the decision unit; and a stacking unit which comprises a first stacker that stacks sheets discriminated as good bills by the discrimination unit and a second stacker that stacks sheets discriminated as bad bills by the discrimination unit.

Embodiments will be described hereinafter with reference to the drawings.

Figure 1:
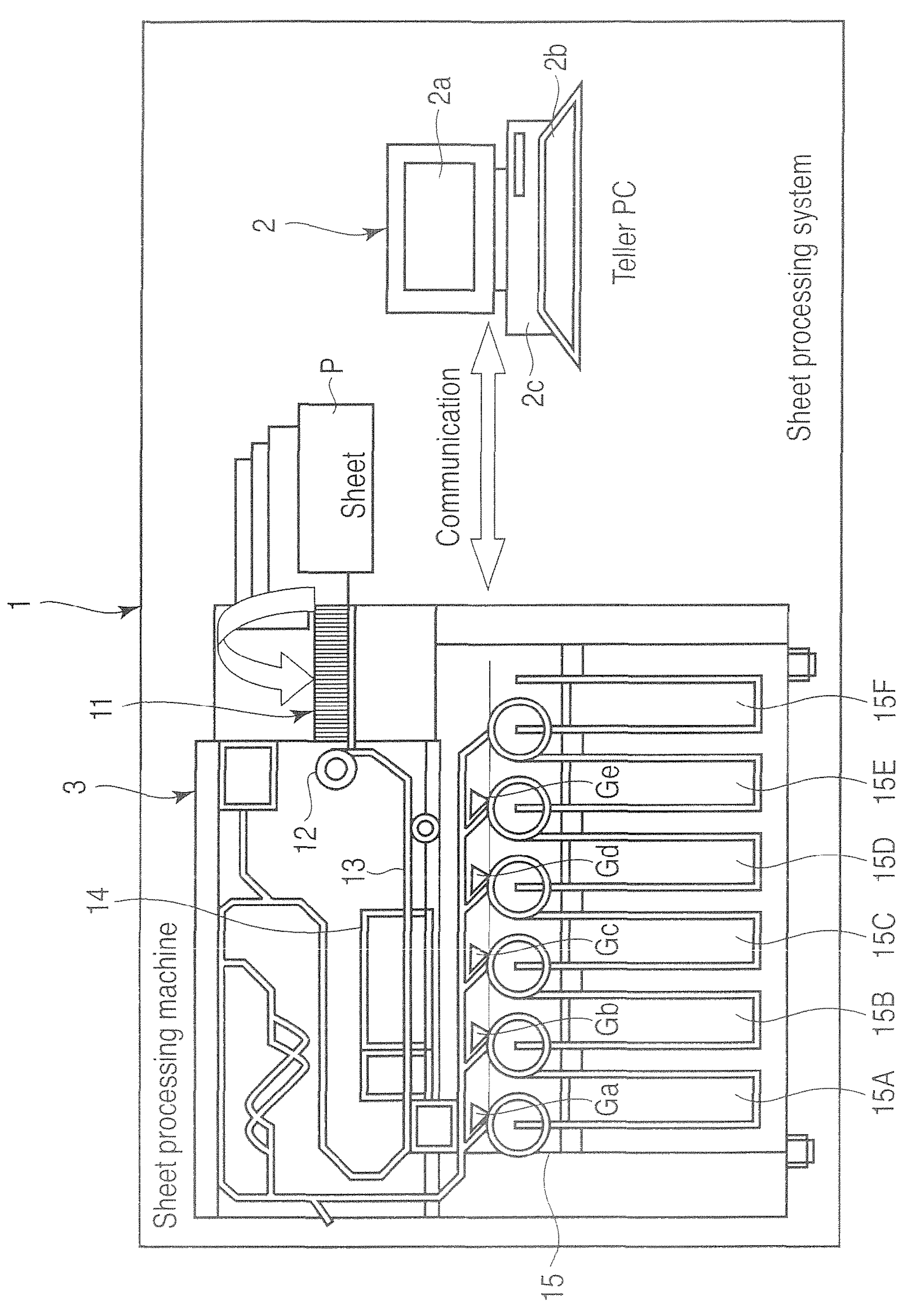
FIG. 1 is a schematic view showing a configuration example of a sheet processing system according to an embodiment.
Figure 2:
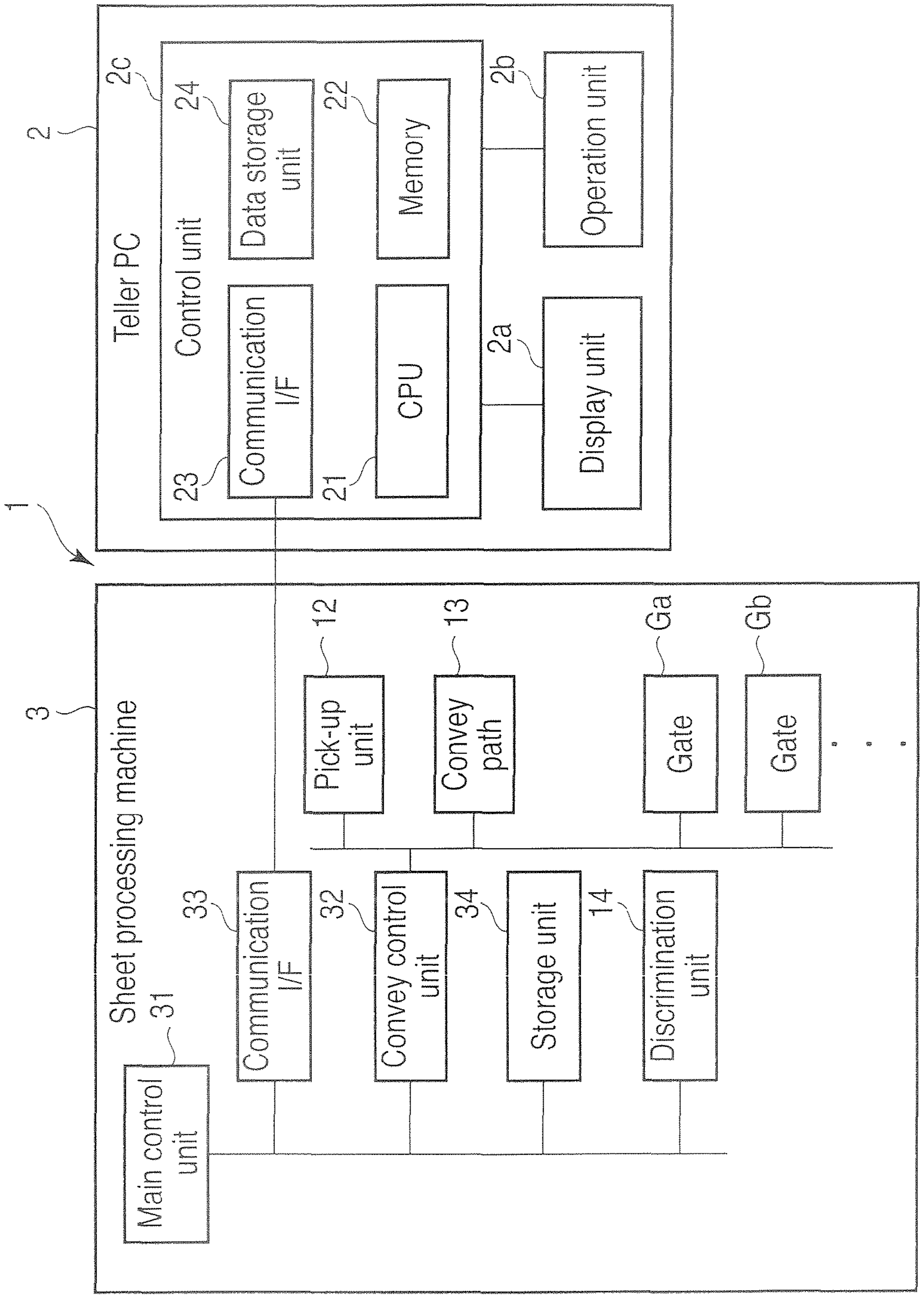
FIG. 2 is a block diagram showing an example of the arrangements in a teller PC and sheet processing machine which form the sheet processing system.

FIG. 1 is a schematic view showing a configuration example of a sheet processing system 1 according to an embodiment. FIG. 2 is a schematic block diagram showing an example of the arrangements of control systems in a teller PC 2 and sheet processing machine 3.

The sheet processing system 1 shown in FIG. 1 is a system which processes sheets such as banknotes. The sheet processing system 1 executes sorting processing of sheets. The sheet processing system 1 sorts sheets according to their denominations or their degrees of contamination/damage (degrees of contamination or damage). For example, the sheet processing system 1 sorts sheets into good and bad bills according to their degrees of contamination/damage.

As shown in FIG. 1, the sheet processing system 1 includes a teller PC (host controller) 2 and sheet processing machine 3. Note that various scales of sheet processing systems are available depending on their operation forms. The sheet processing system with the configuration example shown in FIG. 1 assumes that of a relatively small scale. However, this embodiment is not limited to the scale of the sheet processing system. For example, this embodiment is applicable to a large-scale sheet processing system.

The teller PC (host controller) 2 has a display unit 2*a*, operation unit 2*b*, and control unit 3*c*. The display unit 2*a* includes a display device. The display unit 2*a* displays operation guides and the like. The operation unit 2*b* includes an input device such as a keyboard or mouse. An operator inputs required information using the operation unit 2*b* according to the operation guides displayed on the display unit 2*a*. The operator inputs setting information or an operation instruction with respect to the sheet processing machine 3 using the operation unit 2*b*. Note that the display device as the display unit 2*a* may include that incorporating a touch panel. This display device also function as the operation unit 2*b* together with the display unit 2*a*.

The control unit 2*c* includes a main body unit of an electronic computer (PC). The control unit 2*c* controls the overall teller PC 2. The control unit 2*c* controls the display unit 2*a* and operation unit 2*b*. The control unit 2*c* displays a setting screen used to input an operation instruction or setting instruction with respect to the sheet processing machine 3 on the display unit 2*a*. The control unit 2*c* outputs information based on the operation instruction or setting instruction input via the operation unit 2*b* the sheet processing machine 3.

The control unit 2*c* has a CPU 21, memory 22, communication interface 23, data storage unit 24, and various interfaces (not shown), as shown in FIG. 2.

The CPU 21 controls the overall teller PC 2. The CPU 21 implements various processing functions by executing programs. For example, the CPU 21 implements various data processing functions by executing programs stored in the memory 22.

The memory 22 includes a nonvolatile memory as a program memory used to store program data, control data, or the like, and a working memory such as a RAM used to store processing data.

The communication interface 23 is one of external interfaces of the control unit 2*c*. The communication interface 23 is an interface used to communicate with the sheet processing machine 3. The control unit 2*c* sends an operation instruction or setting information to the sheet processing machine 3, and receives information such as a processing result from the sheet processing machine 3 via this communication interface 23.

The data storage unit 24 includes a storage device such as a hard disk drive (HDD). The data storage unit 24 stores information such as the processing results in the sheet processing machine 3 received by the communication interface 23. The data storage unit 24 may store, e.g., standard setting information for the sheet processing machine 3.

The CPU 21 of the teller PC 2 periodically requests the sheet processing machine 3 to send data indicating the processing result. The request of data indicating the processing result to the sheet processing machine 3 is issued at the time of accounting processing or completion processing in which the sheet processing machine 3 stops for a predetermined period of time. The data indicating the processing result received from the sheet processing machine 3 in response to such request is stored in the data storage unit 24. The data storage unit 24 stores the data indicating the processing result received from the sheet processing machine 3 by appending information such as a date and time. The data stored in the data storage unit 24 include discrimination results by a discrimination unit 14 (to be described later) in the sheet processing machine 3. The discrimination results by the discrimination unit 14 include data counted for, e.g., denominations and various detection items to be described later.

The sheet processing machine 3 is an apparatus which executes sorting processing of sheets. The sheet processing machine 3 is set with a plurality of sheets. The sheet processing machine 3 executes sorting processing of the plurality of set sheets under conditions given from the teller PC 2. For example, the sheet processing machine 3 executes processing for sorting sheets into good and bad bills to attain a ratio (good or bad bill ratio) designated by an operator at the teller PC 2.

As shown in FIG. 1, a feeder unit 11, pick-up unit 12, convey path 13, discrimination unit (discrimination unit) 14, stacking unit 15, and the like are arranged in the sheet processing machine 3.

In the feeder unit 11, a plurality of sheets to be processed are set. Sheets P set in the feeder unit 11 are picked up one by one by a pick-up roller (not shown) as the pick-up unit 12. The sheet P picked up by the pick-up unit 12 is fed onto the convey path 13. The sheet P fed onto the convey path 13 is conveyed to the discrimination unit 14.

The discrimination unit 14 discriminates a state of each sheet P. The discrimination unit 14 discriminates the state of the sheet by detecting various kinds of feature information on the sheet. The discrimination unit 14 discriminates a denomination, authenticity, and good/bad state of the sheet P. For example, the discrimination unit 14 discriminates based on various kinds of feature information detected from the sheet whether or not the sheet is a good or bad bill.

The discrimination unit 14 has, as detection units used to detect various feature information on a sheet, an optical detection sensor (scanner), thickness detection sensor, magnetic detection sensor, fluorescent detection sensor, and the like. Also, the discrimination unit 14 has a data processing unit which processes signals from these detection units. The discrimination unit 14 discriminates the denomination, authenticity, and good/bad state of the sheet P when the processing unit processes signals detected by the respective detection units. For example, the discrimination unit 14 detects values indicating the state of the sheet P for various detection items associated with any damage or contamination as good/bad determination. The discrimination unit 14 determines whether the sheet P is a good or bad bill by seeing if the detected values of the detection items are equal to or larger than reference values. Note that final good/bad discrimination for the sheet P may be made by a control unit 31. In this case, the discrimination unit 14 may supply information indicating the detection results by the respective detection units to the control unit 31.

The stacking unit 15 has a plurality of stackers 15A, 15B, . . . . These stackers 15A, 15B, . . . are respectively provided with branch gates Ga, Gb, . . . . The respective branch gates Ga, Gb, . . . are arranged on the convey path which conveys sheets that have undergone the discrimination processing by the discrimination unit 14. The branch gates Ga, Gb, . . . are used to guide sheets which have undergone the discrimination processing by the discrimination unit 14 to the stackers 15A, 15B, . . . . The branch gates Ga, Gb, . . . are drive-controlled by the discrimination results of the discrimination unit 14. That is, in the sheet processing machine 3, sheets set in the feeder unit 11 are stacked in the respective stackers 15A, 15B, . . . based on the discrimination results by the discrimination unit 14.

A control system of the sheet processing machine 3 is configured by the control unit 31, a convey control unit 32, a communication interface 33, and the like, as shown in FIG. 2.

The control unit 31 controls the overall sheet processing machine 3. To the control unit 31, the convey control unit 32, the communication interface 33, a storage device 34, the discrimination unit 14, and the like are connected. The control unit 31 controls the sheet processing machine 3 to operate according to the setting contents supplied via the communication interface 33. The controller 31 sets reference values (reference levels) for good/bad discrimination designated from the teller PC 2 in the discrimination unit 14, and supplies an operation instruction to the convey control unit 32, thereby controlling sheet processing in the sheet processing machine 3.

The convey control unit 32 controls conveying of sheets in the sheet processing machine 3. The convey control unit 32 is connected to respective units required to convey the sheets P. For example, to the convey control unit 32, the pick-up unit 12, convey path 13, and gate group G (Ga, Gb, . . . ) are connected. The convey control unit 32 monitors the convey states of respective sheets based on signals from sensors (not shown) arranged at respective units in the sheet processing machine 3. The convey control unit 32 controls conveying of the sheets P while monitoring the positions of the respective sheets P in the sheet processing machine 3.

That is, upon reception of an operation instruction from the control unit 31, the convey control unit 32 rotates a pick-up roller (not shown) included in the pick-up unit 12 to take up sheets set in the feeder unit 11 one by one onto the convey path 13. After a sheet is taken up onto the convey path 13, the convey control unit 32 controls driving of convey rollers (not shown) arranged at respective positions of the convey path 13, thereby conveying the sheet P. The convey control unit 32 controls the convey path 13 to pass the sheet P through the interior of the discrimination unit 14. In synchronism with the convey timing of the sheet P at which the discrimination result of the discrimination unit 14 is obtained, the convey control unit 32 controls driving of one of the gates Ga, Gb, . . . selected based on the discrimination result of the discrimination unit 14, thus stacking the sheet P in one of the stackers 15A, 15B, . . . according to the discrimination result.

The communication interface 33 is an interface required to exchange data with the teller PC 2. For example, the communication interface 33 transmits, for example, the discrimination result for each sheet P by the discrimination unit 14 as information indicating the processing result in the sheet processing machine 3 to the teller PC 2. The communication interface 33 also serves as an interface required to receive setting information associated with processing in the sheet processing machine 3 from the teller PC 2.

The discrimination unit 14 discriminates the denominations, orientations, authenticities, good/bad states (degrees of contamination/damage), and the like of sheets P based on the detection results of the various detection units for the conveyed sheets P. This discrimination result is supplied from the discrimination unit 14 to the control unit 31. Based on the discrimination results, the control unit 31 decides convey destinations of sheets (stackers used to stack the sheets). After the convey destinations are decided, the control unit 31 supplies information indicating the convey destinations of sheets (stackers used to stack the sheets) to the convey control unit 32. The convey control unit 32 controls driving of the gates Ga to Gb according to the instruction from the control unit 31, thus distributing the sheets P to the respective stackers.

Figure 3:
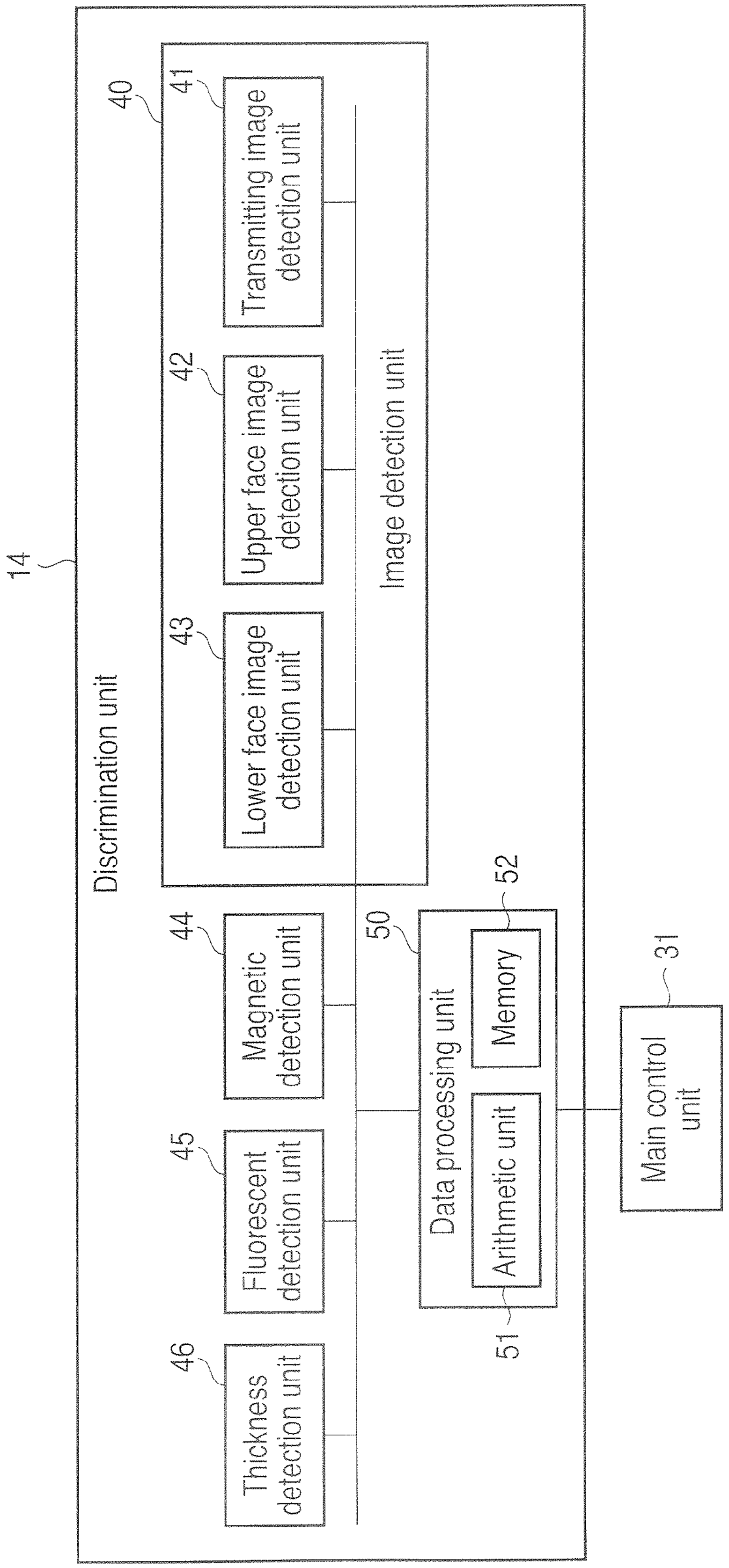
FIG. 3 is a block diagram showing an example of the arrangement of a discrimination unit.

FIG. 3 is a schematic block diagram showing an example of the arrangement in the discrimination unit 14.

As shown in FIG. 3, in the discrimination unit 14, sheets are conveyed by convey rollers (not shown). In the discrimination unit 14, various detection units are arranged along the convey path of sheets. For example, in the example shown in FIG. 3, a transmitting image detection unit 41, upper face image detection unit 42, lower face image detection unit 43, magnetic detection unit 44, fluorescent detection unit 45, and thickness detection unit 46 are arranged. Also, the discrimination unit 14 includes a data processing unit 50 connected to these detection units 41 to 46.

The transmitting image detection unit 41 detects image information based on light transmitting through each sheet P. The upper face image detection unit 42 detects image information based on reflected light from a first face (upper face) of each sheet P. The lower face image detection unit 43 detects image information based on reflected light from a second face (lower face) of each sheet P. The magnetic detection unit 44 detects a magnetic print characteristic on each sheet P. The fluorescent detection unit 45 detects fluorescent-emitting information on each sheet P. The thickness detection unit 46 detects the thickness of each sheet P as a whole.

Each of the transmitting image detection unit 41, upper face image detection unit 42, and lower face image detection unit 43 is a linear image sensor, which includes, for example, an LED array as a light-emitting unit, and a photodiode array or CCD (Charge Coupled Device) as a light-receiving unit, and visible light or near infrared light is used for the LED as usage. Each of the upper face image detection unit 42 and lower face image detection unit 43 includes a white reference portion (not shown) used to decide a white reference value at one end of the reading position of the image sensor, and corrects a read image by a shading correction unit (not shown) based on a read image of this white reference portion. Note that in the following description, the transmitting image detection unit 41, upper face image detection unit 42, and lower face image detection unit 43 will be referred to as an image detection unit 40.

The magnetic detection unit 44 detects magnetism on each sheet P. The magnetic detection unit 44 detects characters or a picture printed using ink having magnetism on each sheet P. The magnetic detection unit 44 includes, for example, a sensor like a magnetic head. In this case, in the magnetic detection unit 44, a DC bias current is applied to the primary side of a core member, and a secondary side coil detects a change in flux (magnetic flux) when a magnetic material passes through a head portion.

The fluorescent detection unit 45 detects a drawing pattern printed using fluorescent-emitting ink from a conveyed banknote. For example, the fluorescent detection unit 45 includes an ultraviolet-emitting lamp as a light-emitting unit (not shown), and detects light emanating from a banknote by a spot field of a photodiode as a light-receiving unit (not shown).

The thickness detection unit 46 detects the thickness of each conveyed sheet. The thickness detection unit 46 outputs an electrical signal indicating the thickness of each conveyed sheet. For example, the thickness detection unit 46 sandwiches a sheet by two rollers, and converts a displacement amount of one roller or a shaft which supports that roller into a voltage value indicating a thickness by, e.g., a displacement sensor.

The data processing unit 5C executes data processing for discriminating the denomination, authenticity, good/bad state, and the like of each sheet based on pieces of information detected by the respective detection units 41 to 46. The data processing unit 50 has an arithmetic unit 51 and memory 52. The arithmetic unit 51 processes pieces of information from the detection units 41 to 46. The memory 52 stores reference levels as reference values required to judge the denomination, authenticity, good/bad state, and the like based on the pieces of information obtained from the detection units 41 to 46.

For example, the arithmetic unit 51 discriminates the denomination, authenticity, and good/bad state of each sheet by comparing the respective pieces of information obtained from the detection units 41 to 46 with the reference levels stored in the memory 52. The arithmetic unit 51 may be implemented by either hardware or software. In the latter case, the arithmetic unit 51 implements a data processing function such as discrimination processing when an arithmetic element (not shown) executes programs stored in a memory (not shown).

The memory 52 may also serve as a buffer which stores data indicating discrimination results by the arithmetic unit 51. In this case, in the discrimination unit 14, data indicating discrimination results for respective denominations and respective detection items are stored in the memory 52. For this reason, on the memory 52 which serves as a buffer memory for storing the processing results, storage areas as many as the number of denominations to be handled×the number of orientations×the number of good/bad detection items are assured. Also, the data indicating the discrimination results stored in the memory 52 are cleared after they are transmitted to the teller PC 2. This is to avoid data from overflowing.

Note that the statistical data indicating the discrimination results by the discrimination unit 14 may be handled by the control unit 31. In this case, the control unit 31 receives the discrimination results of the discrimination unit 14, and executes total counting processing for data as the received discrimination results. The control unit 31 stores statistical data indicating processing results obtained by the counting processing in the storage device 34. The control unit 31 transmits count data indicating the processing results stored in the storage device 34 the teller PC 2 via the communication interface 33 in response to a request from the teller PC 2.

The good/bad discrimination processing in the discrimination unit 14 will be described below.

The discrimination unit 14 discriminates a denomination, authenticity, orientation (obverse, reverse, normal, or reverse), and good/bad state of a sheet P. The discrimination unit 14 discriminates the denomination, authenticity, orientation, and good/bad state by comparing pieces of information detected by the detection units 41 to 46 with various reference values. Normally, the reference values required to discriminate the denominations, authenticities, and orientations of sheets P should not be frequently changed during operation. By contrast, a level as a reference value required to discriminate whether a sheet is a good or bad bill (to be referred to as a reference level hereinafter) is preferably changed as needed according to a user's request even during operation of the sheet processing system.

In the sheet processing system 1 of this embodiment, the discrimination unit 14 executes the good/bad discrimination processing so that a ratio between good and bad bills is equal to that designated by the user. In order to attain such processing, reference levels which set the ratio between good and bad bills to be equal to the ratio designated by the user are appropriately set in the discrimination unit 14. The reference levels as the reference values required to discriminate whether a sheet is a good or bad bill are stored in the memory 52. The reference levels stored in the memory 52 are decided by the teller PC 2. The memory 52 can store reference levels for various detection items in correspondence with denominations.

That is, the reference levels are set depending on detection items associated with good/bad discrimination and depending on denominations. The detection items associated with good/bad discrimination are pieces of information determined by the data processing unit 50 based on pieces of information detected by the detection units 41 to 46 in the discrimination unit 14. In other words, the discrimination unit 14 has various detection units corresponding to various detection items as processing functions implemented by the detection units 41 to 46 and the data processing unit 50.

Figure 4:
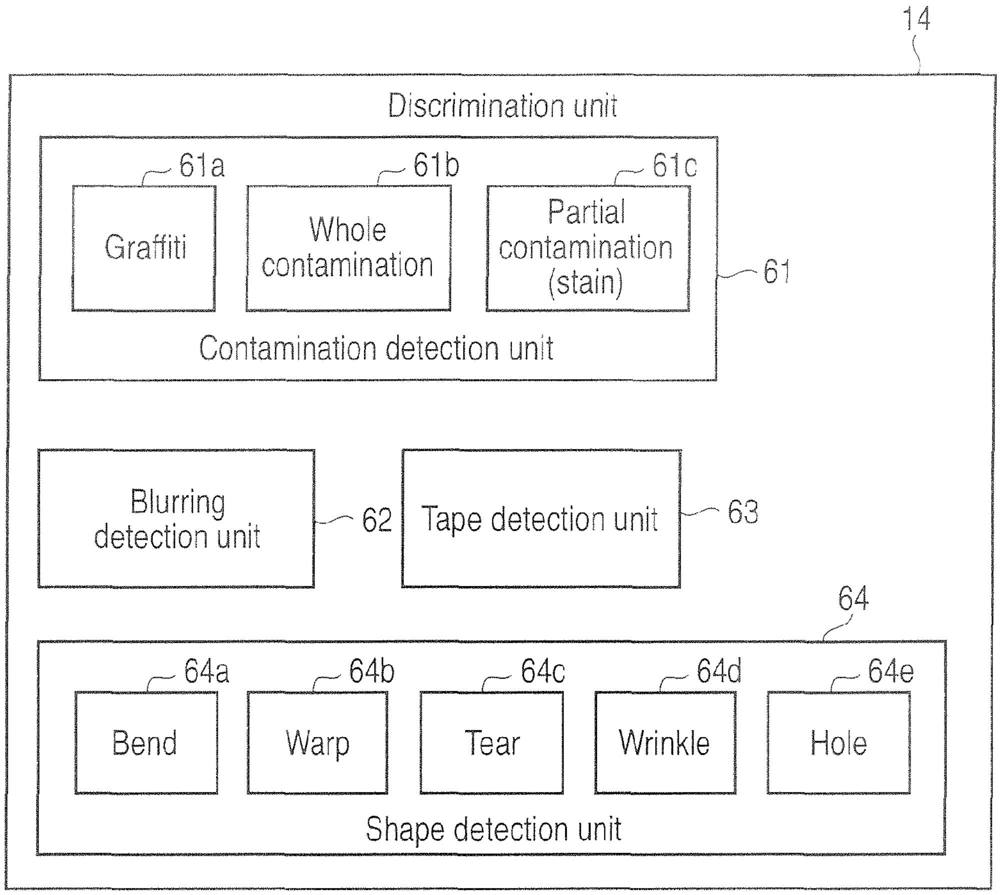
FIG. 4 is a block diagram showing respective detection units as various detection functions implemented by the discrimination unit.

FIG. 4 is a block diagram showing an example of detection units as detection processing functions implemented in the discrimination unit 14. The detection units shown in FIG. 4 detect and output pieces of information corresponding to the detection items associated with good/bad discrimination. In the example shown in FIG. 4, the discrimination unit 14 has functions of detecting degrees of contamination and damage (degrees of contamination/damage) such as a contamination detection unit 61, blurring detection unit 62, tape detection unit 63, and shape detection unit 64. These detection units 61 to 64 are processing functions required to detect "contamination", "blurring", "tape adhesion", and "shape deterioration" states on a sheet. These detection units 61 to 64 correspond to "contamination", "blurring", "tape adhesion", and "shape deterioration" as the detection items associated with good/bad discrimination.

The contamination detection unit 61 detects information indicating a degree of contamination on each sheet P. The contamination detection unit 61 detects a state (degree) of contamination on each sheet P from image information detected by the image detection unit 40. For example, the contamination detection unit 61 extracts information indicating a degree of contamination from image information in a predetermined contamination detection region in the image information of the sheet P detected by the image detection unit 40.

Figure 5:
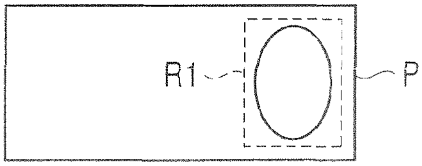
FIG. 5 is a view showing a setting example of a region used to detect any contamination of sheets (contamination detection region)

FIG. 5 is a view showing a setting example of a region used to detect contamination on a sheet (contamination detection region) R1. FIG. 5 shows an example in which a portion where a drawing pattern is not printed (e.g., a region of a watermark portion) is set as the contamination detection region R1. When such contamination detection region is set, the contamination detection unit 61 detects a value indicating brightness (for example, an integrated value of brightness levels) in the contamination detection region R1 as information indicating a degree of contamination. In a portion where no drawing pattern is printed, an image becomes darker with increasing contamination level. For this reason, such value can represent the contamination state on the sheet.

When the good/bad state of a sheet is to be determined according to the degree of contamination, a reference value (a reference level for contamination) for information detected by the aforementioned contamination detection unit 61 is set in the discrimination unit 14. When such reference level is set, the discrimination unit 14 discriminates whether a sheet is a good or bad bill by comparing the information detected by the contamination detection unit 61 and the reference level for contamination.

Note that as for "contamination", detection items which are further classified in detail may be detected. For example, as shown in FIG. 4, as detection units which detect a contamination state, a graffiti detection unit 61*a*, whole contamination detection unit 61*b*, and partial contamination detection unit 61*c* which respectively detect "graffiti", "whole contamination", and "partial contamination" may be arranged.

The graffiti detection unit 61*a* may extract a graffiti probability region from image information of a whole sheet detected by the image detection unit 40 as information indicating a graffiti state, and may output information indicating the size of the graffiti probability region.

The whole contamination detection unit 61*b* may output information indicating a difference amount between the brightness of image information of a whole sheet detected by the image detection unit 40 and that of image information of a whole sheet as a reference (sample) as information indicating contamination on the whole sheet. Alternatively, the whole contamination detection unit 61*b* may output a difference value between the integrated value of brightness levels on image information of the whole sheet and that on image information of a whole sheet as a reference as information indicating a contamination state on the whole sheet.

The partial contamination detection unit 61*c* may detect partial contamination by dividing image information of a sheet detected by the image detection unit 40 into small regions, and detecting a difference amount from image information of a small region (sample) as a reference for each small region.

The discrimination unit 14 may determine the good/bad state of a sheet based on the "graffiti", "whole contamination", and "partial contamination" states detected by these detection units 61*a*, 61*b*, and 61*c*. In this case, reference values (reference levels) for pieces of information indicating "graffiti", "whole contamination", and "partial contamination" detected by the aforementioned detection units 61*a*, 61*b*, and 61*c* are respectively set in the discrimination unit 14.

The blurring detection unit 62 detects a degree of print blurring on each sheet P. That is, the blurring detection unit 62 detects information indicating a state (degree) of blurring on each sheet P from image information of the sheet P detected by the image detection unit 40. For example, the blurring detection unit 62 extracts information indicating a degree of print blurring from image information of a predetermined blurring detection region in the image information of the sheet P detected by the image detection unit 40.

Figure 6:
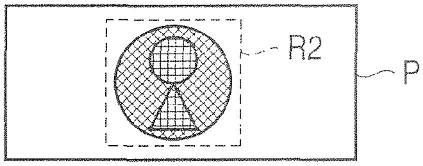
FIG. 6 is a view showing a setting example of a region used to detect any print blurring of sheets (blurring detection region)

FIG. 6 is a view showing a setting example of a region used to detect print blurring on a sheet (blurring detection region) R2. FIG. 6 shows an example in which a region having a high print density of, e.g., a printed drawing pattern on a sheet is set as the blurring detection region R2. When such blurring detection region R2 is set, the blurring detection unit 62 detects a value indicating a density (for example, an integrated value of density values of pixels) in the blurring detection region R2 as information indicating a degree of blurring. In a portion having a high print density a printed drawing pattern, a density value lowers as printing is blurred more. For this reason, the aforementioned value can represent the blurring state on the sheet.

When the good/bad state of a sheet is to be determined according to the degree of blurring, a reference value (reference level for blurring) for information detected by the aforementioned blurring detection unit 62 is set in the discrimination unit 14. When such reference level is set, the discrimination unit 14 discriminates whether a sheet is a good or bad bill by comparing the information detected by the blurring detection unit 62 and the reference level for blurring.

Note that the detection unit 62 which detects blurring may include detection units which detect "whole blurring", "partial blurring", and the like. For example, a degree of blurring on a whole sheet can be detected by comparing the density in image information of the whole sheet and a predetermined reference value. Also, a degree of partial blurring on a sheet can be detected by comparing a density obtained from image information of each small region on the sheet and a predetermined reference value. The good/bad state of a sheet may be determined according to such degree of "whole blurring" or "partial blurring".

The tape detection unit 63 detects information of a tape adhered on each sheet P. That is, the tape detection unit 63 detects information indicating a region where a tape is probably adhered on a sheet P based on thickness information detected by the thickness detection unit 46. For example, when region of a sheet P, which is locally thicker than a predetermined thickness, is detected, the tape detection unit 63 extracts information indicating that region as information indicating an adhered tape. In this case, the tape detection unit 63 outputs information indicating a size of a region where a tape is probably adhered.

When the good/bad state of a sheet is to be determined according to a tape adhered state, a reference value (reference level for tape adhesion) for information detected by the aforementioned tape detection unit 63 is set in the discrimination unit 14. When such reference level is set, the discrimination unit 14 discriminates whether a sheet is a good or bad bill by comparing information detected by the tape detection unit 63 and the reference level for tape adhesion.

The shape detection unit 64 detects information indicating a degree of shape deterioration (damage) on each sheet P. That is, the shape detection unit 64 detects information indicating a state (degree) of damage on a sheet P from image information detected by the image detection unit 40 and thickness information detected by thickness detection unit 46. For example, the shape detection unit 64 detects information indicating a deficit portion of the sheet by comparing a shape of the whole sheet obtained from the image information detected by the image detection unit 40 and that as a reference for a denomination of the sheet. In this case, the shape detection unit 64 outputs information indicating a larger degree of damage as a deficit portion is larger with respect to the reference shape.

The good/bad state of a sheet is to be determined according to deterioration of a shape (degree of damage), a reference value (reference level for shape deterioration) for information detected by the aforementioned shape detection unit 64 is set in the discrimination unit 14. When such reference level is set, the discrimination unit 14 discriminates whether a sheet is a good or bad bill by comparing the information detected by the shape detection unit 64 and the reference level for shape deterioration.

Note that in the detection unit 64 which detects a shape, a bend detection unit 64*a*, warp detection unit 64*b*, tear detection unit 64*c*, wrinkle detection unit 64*d*, and hole detection unit 64*e* which respectively detect "bend", "warp (curve of an end portion)", "tear (chip or break)", "wrinkle", and "hole" may be arranged.

The bend detection unit 64*a* detects a bend state at an end portion of a sheet as shape deterioration on the sheet. For example, the bend detection unit 64*a* detects a degree of bend an end portion of a sheet based on image information of the whole sheet detected by the image detection unit 40 and thickness information at respective portions of the sheet detected by the thickness detection unit 46.

The warp detection unit 64*b* detects a warp state (curve of an end portion) at an end portion of a sheet as shape deterioration on the sheet. For example, the warp detection unit 64*b* detects a degree of warp based on image information of the end portion of the sheet detected by the image detection unit 40.

The tear detection unit 64*c* detects a chip or tear state of an end portion of a sheet as shape deterioration on the sheet. For example, the tear detection unit 64*c* detects a degree of chip or tear based on image information of the sheet detected by the image detection unit 40.

The wrinkle detection unit 64*d* detects a wrinkle state of a whole sheet as shape deterioration on the sheet. For example, the wrinkle detection unit 64*d* detects a degree of wrinkle based on image information of a whole sheet detected by the image detection unit 40 or thickness information of the whole sheet detected by the thickness detection unit 46.

The hole detection unit 64*e* detects a hole state on a sheet as shape deterioration on the sheet. For example, the hole detection unit 64*e* can detect a degree of hole on a sheet based on image information of the sheet detected by the image detection unit 40.

The discrimination unit 14 may determine the good/bad state of a sheet based on pieces of information ("bend", "warp", "tear", "wrinkle", and "hole" states) detected by these detection units 64*a*, 64*b*, 64*c*, 64*d*, and 64*e*. In this case, reference values (reference levels) for pieces of information detected by these detection units 64*a*, 64*b*, 64*c*, 64*d*, and 64*e* are set in the discrimination unit 14.

In the following description, assume that each of the aforementioned detection units 61 to 64 detects information indicating a degree of contamination/damage on a sheet in a plurality of levels. For example, assume that the contamination detection unit 61 detects information indicating a degree of contamination in 10 levels. In this case, the reference level for contamination is also selectively set from the 10 levels. Assume that the blurring detection unit 62 detects information indicating a degree of blurring on a sheet in 10 levels. In this case, the reference level for blurring is also selectively set from the 10 levels. Assume that the tape detection unit 63 detects information indicating a degree of tape adhesion on a sheet in 10 levels. In this case, the reference level for tape adhesion is also selectively set from the 10 levels. Assume that the shape detection unit 64 detects information indicating a degree of shape deterioration on a sheet in 10 levels. In this case, the reference level for shape deterioration is also selectively set from the 10 levels.

A reference level setting method for the good/bad discrimination processing will be described below.

The teller PC 2 sets reference levels used as reference values for various kinds of discrimination processing in the discrimination unit 14. For example, the teller PC 2 sets reference levels for various detection items associated with the aforementioned good/bad discrimination. Also, the processing result in the sheet processing machine 3 is transmitted to the teller PC 2. Information indicating the processing result received from the sheet processing machine 3 is stored in the data storage unit 24 of the teller PC 2. The information as the processing result transmitted from the sheet processing machine 3 to the teller PC 2 includes pieces of information indicating the discrimination results by the discrimination unit 14, That is, the detection result for each detection item such as "contamination", "blurring", "tape adhesion", or "shape deterioration" by the discrimination unit 14 is transmitted as the processing result to the teller PC 2. The teller PC 2 stores the pieces of information from the sheet processing machine 3 in the data storage unit 24 as count data obtained by counting these pieces of information for respective denominations and detection items. The teller PC 2 decides reference levels according to setting contents designated by the user with reference to data as the actual processing result including the discrimination results of the respective detection items stored in the data storage unit 24. The teller PC 2 sets the reference levels required to discriminate a good/bad state in the sheet processing machine 3.

A first setting example of the reference levels used in the good/bad discrimination processing will be described first.

In the first setting example, the setting example of a reference level for "contamination" and that for "blurring" as detection items required to discriminate a good/bad state will be explained.

Figure 7:
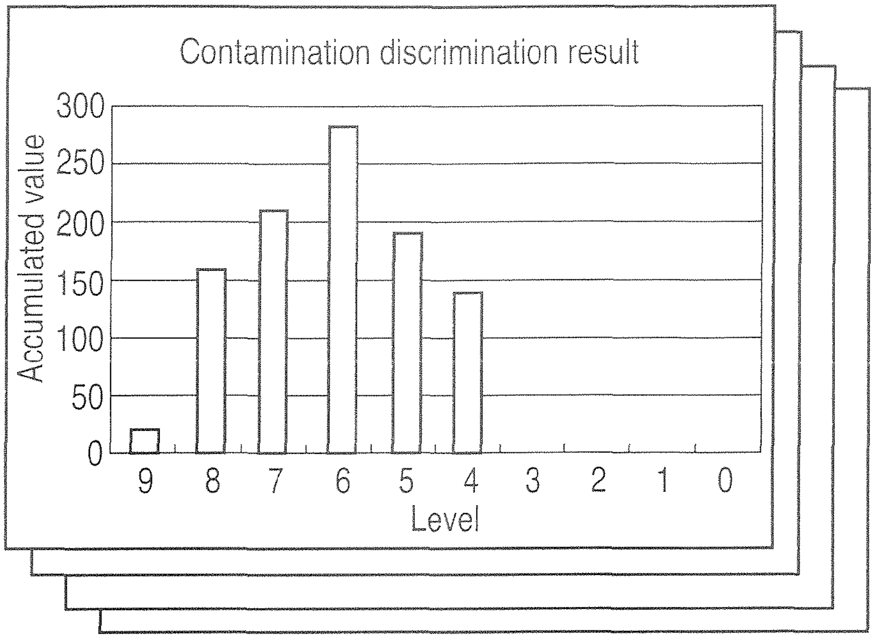
FIG. 7 is a graph showing an example of the accumulated numbers of sheets for respective contamination levels on sheets.

FIG. 7 is a graph showing an example of the accumulated numbers of sheets for respective contamination levels on sheets.

In the example shown in FIG. 7, assume that the contamination detection unit 61 detects contamination levels of sheets in 10 levels. For example, when the contamination detection unit 61 detects contamination levels of sheets in 10 levels, the data storage unit 24 of the teller PC 2 stores pieces of information indicating the accumulated numbers of sheets for respective 10 levels in association with a plurality of processed sheets. Assume that the example shown in FIG. 7 shows the processing results of about 1000 sheets for a specific denomination by the sheet processing machine 3.

The example shown in FIG. 7 shows that as degrees (levels) of contamination for 1000 sheets of a certain denomination, there are 20 sheets of "level 9"; 160 sheets of "level 8"; 210 sheets of "level 7"; 280 sheets of "level 6"; 190 sheets of "level 5"; 140 sheets of "level 4"; and 0 sheet of "level 3", "level 2", "level 1", and "level 0". The data indicating the accumulated numbers of sheets for respective contamination levels shown in FIG. 7 are held in the data storage unit 24 of the teller PC 2. That is, the teller PC 2 can estimate the tendency of degrees of contamination of sheets to be processed by the sheet processing system based on the data shown in FIG. 7.

Figure 8:
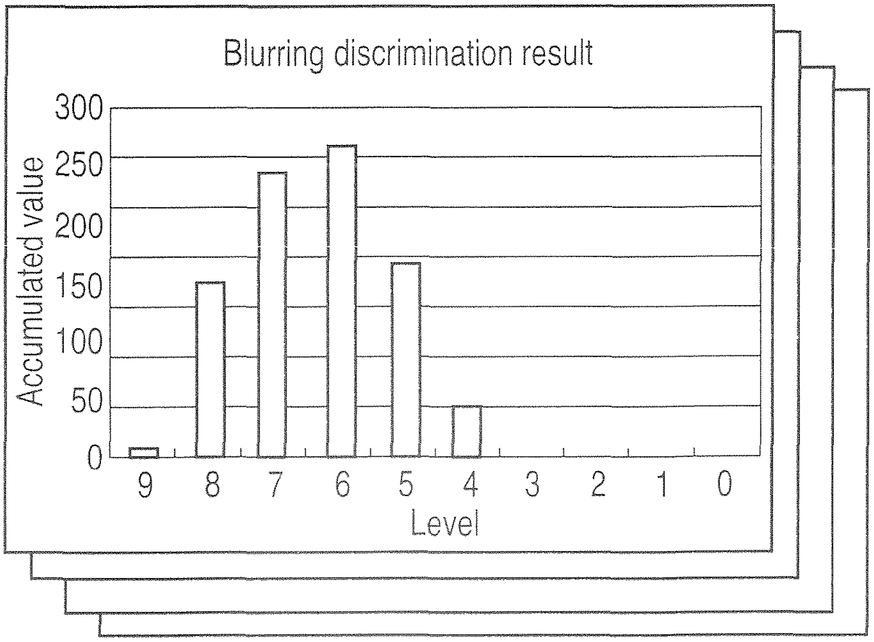
FIG. 8 is a graph showing an example of the accumulated numbers of sheets for respective blurring levels on sheets.

FIG. 8 is a graph showing an example of the accumulated numbers of sheets for respective blurring levels on sheets.

In the example shown in FIG. 8, assume that the blurring detection unit 62 detects blurring levels of sheets in 10 levels. For example, when the blurring detection unit 62 detects blurring levels of sheets in 10 levels, the data storage unit 24 of the teller PC 2 stores pieces of information indicating the accumulated numbers of sheets for respective 10 levels in association with a plurality of processed sheets. Assume that the example shown in FIG. 8 shows the processing results of about 1000 sheets for a specific denomination by the sheet processing machine 3.

The example shown in FIG. 8 shows that as degrees (levels) of blurring for 1000 sheets of a certain denomination, there are 3 sheets of "level 9"; 170 sheets of "level 8"; 280 sheets of "level 7"; 307 sheets of "level 6"; 190 sheets of "level 5"; 50 sheets of "level 4"; and 0 sheet of "level 3", "level 2", "level 1", and "level 0". The data indicating the accumulated numbers of sheets for respective blurring levels shown in FIG. 8 are held in the data storage unit 24 of the teller PC 2. That is, the teller PC 2 can estimate the tendency of degrees of blurring of sheets to be processed by the sheet processing system based on the data shown in FIG. 8.

Note that the data indicating the discrimination results shown in FIGS. 7 and 8 are those which are stored during operation of the sheet processing system. The discrimination unit 14 stores, as the count data, the discrimination results for respective denominations and detection items in the memory 52 as a buffer memory. The data stored in the discrimination unit 14 are output to the teller PC 2 in response to a request. The teller PC 2 stores the count data collected from the sheet processing machine 3 in the data storage unit 24.

A setting operation for the good/bad discrimination processing will be described below.

In this sheet processing system 1, the user (operator) performs a setting operation for the good/bad discrimination processing using the teller PC 2. That is, the teller PC 2 executes processing for setting reference levels according to a desired good bill ratio designated by the user.

Normally, the good bill ratio obtained based on various reference levels varies depending on operation statuses of the sheet processing system. This is because the states of sheets to be processed are different depending on operation statuses. That is, when the actual processing result yields a good bill ratio desired by the user, reference levels according to the operation statuses have to be set. This sheet processing system allows to easily set reference levels which can attain a good bill ratio desired by the user with reference to the stored data as the previous processing results.

Figure 9:
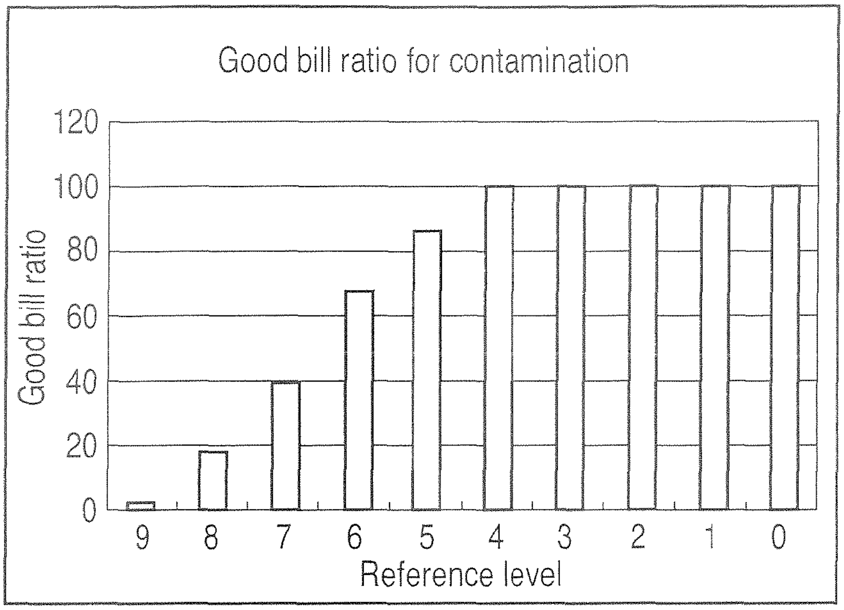
FIG. 9 is a graph showing good bill ratios when respective levels are set as reference levels with respect to the discrimination results of the contamination levels.

FIG. 9 is a graph showing good bill ratios when respective levels are set as reference levels with respect to the discrimination results of the contamination levels shown in FIG. 7.

That is, FIG. 9 shows estimated values of good bill ratios for respective reference levels for contamination in the sheet processing system 1. For example, in the example shown in FIG. 9, when the reference level is set to be "level 7", a good bill ratio is 39%. Therefore, when the user requests a good bill ratio of about 40% for the good/bad discrimination processing based on contamination levels, the reference level for contamination can be set to be "level 7".

Also, the graph showing the good bill ratios for the reference levels for contamination shown in FIG. 9 may be displayed on the display unit 2*a* of the teller PC 2. According to such display contents, the user can easily recognize the relationship between the reference levels for contamination and the good bill ratios based on the previous processing results. As a result, a reference level closest to a good bill ratio desired by the user can be easily decided. Note that the display shown in FIG. 9 can be carried out for other detection items. For example, good bill ratios for reference levels for blurring can be displayed using the same graph as in FIG. 9.

Figure 10:
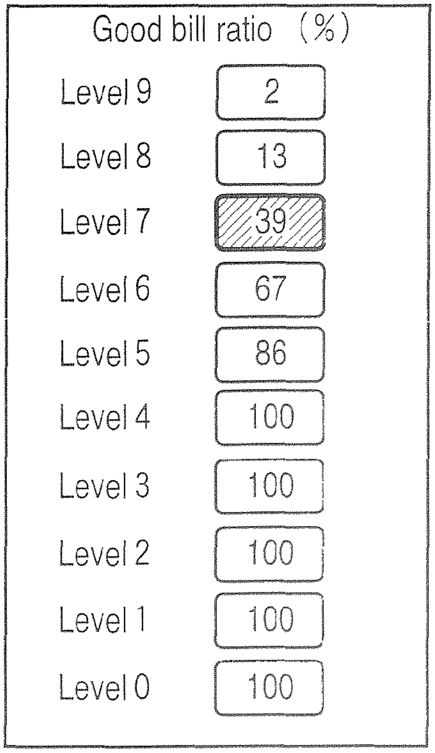
FIG. 10 is a view showing a display example of a good/bad discrimination setting screen based on "contamination"

FIG. 10 is a view showing a display example of a good/bad discrimination setting screen based on "contamination".

The setting screen shown in FIG. 10 is displayed on the display unit 2*a* of the teller PC 2. The display example shown in FIG. 10 displays the reference levels for contamination and good bill ratios in association with each other. In the display example shown in FIG. 10, display frames of the good bill ratios serve as icons selectable by the user using the operation unit 2*b*. According to this display, the user can easily designate a setting of the reference level for contamination by selecting an icon that displays a desired good bill ratio. For example, when the user wants to set a good bill ratio based on contamination to be about 40%, he or she selects an icon that displays 39% closest to 40% using the operation unit 2*b* on the setting screen shown in FIG. 10. In this case, the CPU 21 of the teller PC 2 sets "level 7" displayed in correspondence with the icon that displays 39% as the reference level for contamination.

Figure 11:
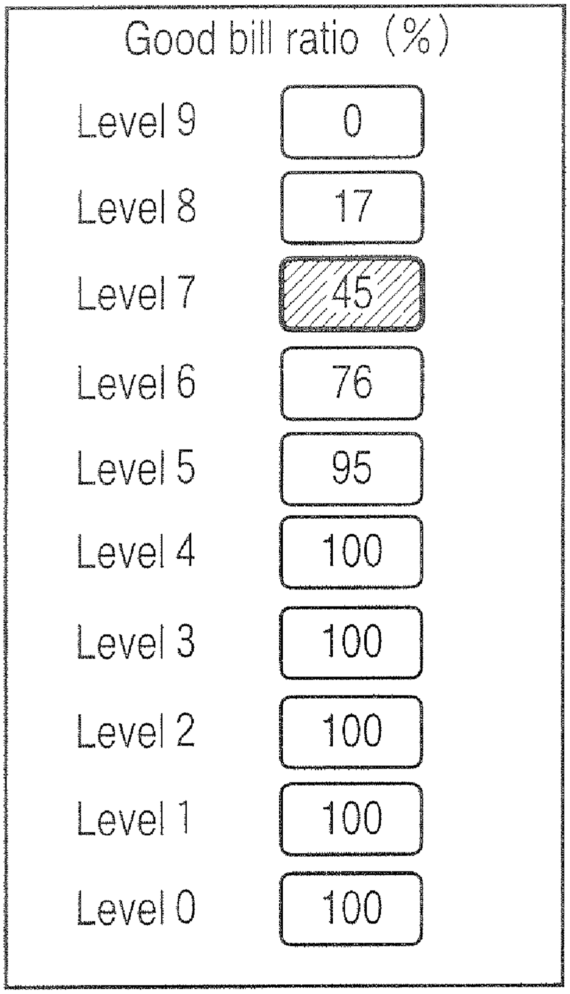
FIG. 11 is a view showing a display example of a good/bad discrimination setting screen based on "blurring"

FIG. 11 is a view showing a display example of a good/bad discrimination setting screen based on "blurring".

The setting screen shown in FIG. 11 is displayed on the display unit 2*a* of the teller PC 2. The display example shown in FIG. 11 displays the reference levels for blurring and good bill ratios in association with each other. The display example shown in FIG. 11 allows the user to select an icon indicating a good bill ratio. According to this display, the user can easily designate a setting of the reference level for blurring by selecting an icon that displays a desired good bill ratio. For example, when the user wants to set a good bill ratio based on blurring to be about 40%, he or she selects an icon that displays 45% closest to 40% using the operation unit 2*b* on the setting screen shown in FIG. 11. In this case, the CPU 21 of the teller PC 2 sets "level 7" displayed in correspondence with the icon that displays 45% as the reference level for blurring.

Note that the same setting screens as in the display examples shown in FIGS. 10 and 11 can be displayed for various detection items other than "contamination" and "blurring".

The good bill ratios for the respective reference levels shown in FIGS. 10 and 11 are calculated from the data stored in the data storage unit 24. Such display data are calculated by a counting program executed by the CPU 21 of the teller PC 2.

For example, the CPU 21 calculates good bill ratios of the respective levels from the data stored in the data storage unit 24 in the following processing sequence. Initially, the CPU 21 loads stored data associated with a specific denomination and specific detection item. Assume that good bill ratios for contamination are to be calculated in this case. Also, assume that it is harder to discriminate good bills with increasing reference level for contamination. In such case, the CPU 21 calculates the accumulated number of sheets until each of respective levels by adding the accumulated numbers of respective higher levels. After the accumulated number of sheets until each of respective levels is calculated, the CPU 21 defines a value obtained by dividing the accumulated number of sheets until each of respective levels by the total accumulated number of sheets as a good bill ratio of that level. According to the aforementioned calculations, a good bill ratio becomes lower with increasing reference level, and higher with decreasing reference level.

The good bill ratios for the respective reference levels can be calculated for respective detection items ("contamination", "blurring", "tape adhesion", "shape deterioration", etc.) from the data stored in the data storage unit 24. By displaying the good bill ratios for the respective reference levels on the display unit 2*a*, the user can easily designate reference levels that can attain a desired good bill ratio.

The data storage unit 24 of the teller PC 2 always stores data indicating various discrimination results for sheets as the processing results during operation of the sheet processing system. In the sheet processing system 1, it is considered that the correspondence between the reference levels and good bill ratios normally becomes stable as an operation period becomes longer unless the operation state changes largely. In this manner, as the operation period becomes longer, this system can set reference levels that can attain a good bill ratio desired by the user with higher precision.

Alternatively, the user may directly designate a target good bill ratio using the operation unit 2*b*.

Figure 12:
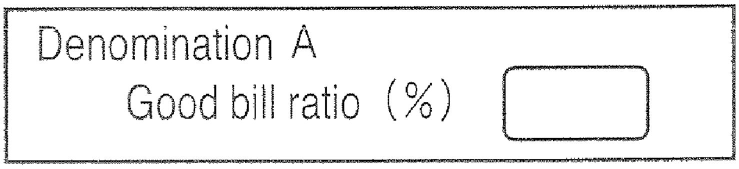
FIG. 12 is a view showing a display example of a setting screen when the user directly designates a target good bill ratio.

FIG. 12 is a view showing a display example of a setting screen when the user directly designates a target good bill ratio.

On the setting screen shown in FIG. 12, the user directly inputs a target good bill ratio as a numerical value using the operation unit 2*b*. In this case, the teller PC 2 decides a reference level closest the good bill ratio input by the user, and sets that reference level in the discrimination unit 14 of the sheet processing machine 3.

When the user inputs a target good bill ratio on the setting screen shown in FIG. 12 using the operation unit 2*b*, the CPU 21 of the teller PC 2 decides a reference level corresponding to a good bill ratio closest to that input by the user based on data stored in the data storage unit 24.

For example, when the user inputs "40%" as a target good bill ratio for contamination, if the data stored in the data storage unit 24 are those shown in FIG. 7, the CPU 21 of the teller PC 2 decides "level 7" as a reference level which makes a good bill ratio closest to 40%. On the other hand, when the user inputs "40%" as a target good bill ratio for blurring, if the data stored in the data storage unit 24 are those shown in FIG. 8, the CPU 21 of the teller PC 2 decides "level 7" as a reference level which makes a good bill ratio closest to 40%.

When the reference levels corresponding to good bill ratios closest to those desired by the user are decided in this way, the CPU 21 transmits the decided reference levels to the sheet processing machine 3 via the communication interface 23. In the sheet processing machine 3, the main control unit 31 receives setting information of the reference levels from the teller PC 2 via the communication interface 33. The main control unit 31 notifies the discrimination unit 14 of the setting information of the reference levels received from the teller PC 2. The discrimination unit 14 updates the reference levels for the respective detection items to those supplied from the teller PC 2.

FIG. 13 shows an example of data notified to the discrimination unit 14 when the reference level for contamination and that for blurring are changed. The example shown in FIG. 13 shows a state in which both the reference levels for "contamination" and "blurring" are changed from "level 5" to "level 7" in association with denomination A.

When the user designates a good bill ratio using a numerical value, the CPU 21 of the teller PC 2 may provide a function of appropriately changing reference levels according to the discrimination results (processing records) supplied from the sheet processing machine 3 during operation. According to this function, even when a reference level corresponding to a good bill ratio closest to that designated by the user has changed during operation, the CPU 21 can set an optimal reference level required to realize the good bill ratio designated by the user. As a result, this system can implement optimal good/bad discrimination processing according to a user's request.

Note that reference levels for respective detection items, which are decided according to, e.g., a good bill ratio, may be registered in the teller PC 2. According to such embodiment, a plurality of setting patterns of reference levels for the respective detection items can be registered in the teller PC 2. In the teller PC 2, reference levels as a setting pattern different from that of the previously set reference levels can be registered.

For example, various setting patterns according to various operation purposes such as a setting pattern used when a good bill extraction amount is to be increased (when a good bill ratio is to be temporarily raised) and a setting pattern used when a bad bill extraction amount is to be increased (when a good bill ratio is to be temporarily reduced) are registered in advance in the teller PC 2. In this case, since the user designates a setting pattern according to the operation purpose, the teller PC 2 can set the setting pattern according to the operation purpose. As a result, the user can selectively use various setting patterns according to operation purposes. Furthermore, the setting patterns to be registered can be held as data independently of those stored in the data storage unit 24. For this reason, this system can also always guarantee stable operations of good/bad discrimination processing using the setting patterns which are registered in advance.

An embodiment that realizes a good bill ratio desired by the user by combining a plurality of detection items will be described below.

When reference levels for good/bad discrimination are set for a plurality of detection items, the discrimination unit 14 discriminates for each detection item whether a sheet is a good or bad bill. That is, when a good or bad bill is discriminated based on the plurality of detection items, good bill ratios (or bad bill ratios) for respective detection items have to be comprehensively judged so as to obtain a ratio between good and bad bills obtained as a final count result, as desired by the user. For this reason, when reference levels for good/bad discrimination are set for the plurality of detection items, various setting patterns may be used.

FIGS. 14, 15, 16, and 17 are views showing setting examples for a plurality of detection items. Assume that in the setting examples shown in FIGS. 14, 15, 16, and 17, bad bill ratios are set for four detection items "contamination", "blurring", "tape (tape adhesion)", and "shape (shape deterioration)" as the plurality of detection items.

FIG. 14 shows a setting example (first setting example) when bad bill ratios are individually set for the plurality of detection items.

In the first setting example shown in FIG. 14, a ratio of sheets finally stacked as bad bills (total bad bill ratio) is not particularly set, a bad bill ratio for "shape" is set to be 1%, that for "tape" is set to be 1%, that for "blurring" is set to be 10%, and that for "contamination" is set to be 30%. For this reason, if bad bill ratios of the respective detection items are achieved, a total bad bill ratio is "30%" from "1+1+10+30=42%". This is because the numbers of sheets determined as bad bills in the plurality of detection items are indefinite. That is, if no sheets are redundantly determined as bad bills in the plurality of detection items, the total bad bill ratio is 42%. By contrast, when all sheets, which are discriminated as bad bills in the detection items other than "contamination" corresponding to a maximum bad bill ratio, are determined as bad bills, the total bad bill ratio is 30% as the bad bill ratio for contamination.

That is, when the bad bill ratios are individually set for the respective detection items like in the first setting example shown in FIG. 14, it is considered that the total bad bill ratio becomes indeterminate. However, in the first setting example shown in FIG. 14, it is considered that the bad bill ratios set for the respective detection items are surely and easily achieved. Therefore, when the user wants a setting that can surely achieve the bad bill ratios for the respective detection items, he or she designates the individual bad bill ratios for the respective detection items without setting the total bad bill ratio like in the first setting example shown in FIG. 14. When the bad bill ratios are designated for the respective detection items like in the first setting example, the CPU 21 of the teller PC 2 sets reference levels according to the designated bad bill ratios in the respective detection items.

FIG. 15 shows a setting example (second setting example) when bad bill ratios are set for the plurality of detection items assigned priority levels.

In the second setting example shown in FIG. 15, a total bad bill ratio is set to be 30%. Also, in the second setting example shown in FIG. 15, a bad bill ratio for "shape" is set to be 1%, that for "tape" is set to be 1%, that for "blurring" is set to be 10%, and that for "contamination" is set to be 18% to 30%. Furthermore, in the second setting example shown in FIG. 15, the priority level of "shape" and "tape" is first, that of "blurring" is second, and that of "contamination" is third.

In such second setting example, the set bad bill ratios are surely achieved for the detection items with the higher priority levels, and the bad bill ratio for the detection item with the lowest priority level is adjusted to have the total bad bill ratio as its setting value. For example, in the second setting example shown in FIG. 15, good/bad discrimination is executed so that the bad bill ratios=1% are surely achieved for "shape" and "tape". Also, good/bad discrimination is executed so that the bad bill ratio=10% set for "blurring" (second priority level) is surely achieved. That is, in the good/bad discrimination associated with "shape", "tape", and "blurring", the bad bill ratio is set as that ranges from 10% at a minimum to 12% at a maximum.

In this embodiment, the total bad bill ratio=30% is set. For this reason, the total bad bill ratio=30% is achieved by varying the bad bill ratio associated with "contamination" with the lowest priority level within a range from 18% to 30%. That is, in the second setting example, the bad bill ratios for the respective detection items are achieved in descending order of priority level, and the bad bill ratio for the detection item with the lowest priority level is adjusted, so as to achieve the setting value of the total bad bill ratio. Such adjustment of the bad bill ratio corresponding to the second setting example is executed by, for example, the CPU 21 of the teller PC 2 with reference to data stored in the data storage unit 24. After the bad bill ratios for the respective detection items are decided, the CPU 21 of the teller PC 2 sets reference levels according to the decided bad bill ratios for the respective detection items.

For example, adjustment for the detection item with the lowest priority level may be decided based on a ratio (probability) of redundantly determining bad bills in the detection item with the lowest priority level and that with the higher priority level. For example, in the second setting example shown in FIG. 15, if a ratio of redundantly discriminating bad bills in the respective items "shape", "tape", and "blurring", and in the item "contamination" is about 50%, the bad bill ratio associated with "contamination" may be adjusted to be about 25% to 26%.

FIG. 16 shows a setting example (third setting example) when bad bill ratios are set for the plurality of detection items assigned priority levels.

In the third setting example shown in FIG. 16, a total bad bill ratio is set to be 70%. Also, in the third setting example shown in FIG. 16, a bad bill ratio for "shape" is set to be 5%, that for "tape" is set to be 5%, that for "blurring" is set to be 20%, and that for "contamination" is set to be 40% to 70%. Furthermore, in the third setting example shown in FIG. 16, the priority level of "shape" and "tape" is first, that of "blurring" is second, and that of "contamination" is third.

In such third setting example, the set bad bill ratios are surely achieved for the detection items with the higher priority levels, and the bad bill ratio for the detection item with the lowest priority level is adjusted to have the total bad bill ratio as its setting value, as in the aforementioned second setting example. For example, in the third setting example shown in FIG. 16, good/bad discrimination is executed so that the bad bill ratios=5% are surely achieved for "shape" and "tape". Also, good/bad discrimination is executed so that the bad bill ratio=20% set for "blurring" (second priority level) is surely achieved. That is, in the good/bad discrimination associated with "shape", "tape", and "blurring", the bad bill ratio is set to be 20 to 30%.

In this embodiment, the total bad bill ratio=70% is set. For this reason, the total bad bill ratio=70% is achieved by varying the bad bill ratio associated with "contamination" with the lowest priority level within a range from 40% to 70%. That is, in the third setting example, the bad bill ratios for the respective detection items are achieved in descending order of priority level, and the bad bill ratio for the detection item with the lowest priority level is adjusted, so as to achieve the setting value of the total bad bill ratio, as in the second setting example. Also, the adjustment in the detection item with the lowest priority level can be implemented by the same method as in the second setting example. Such adjustment of the bad bill ratio corresponding to the third setting example is executed by, for example, the CPU 21 of the teller PC 2 with reference to data stored in the data storage unit 24. After the bad bill ratios for the respective detection items are decided, the CPU 21 of the teller PC 2 sets reference levels according to the decided bad bill ratios for the respective detection items.

However, the third setting example assumes an operation form for discriminating good bills to be loaded in a machine such as an automatic teller machine (ATM). Especially, in the ATM, banknotes as good bills which have undergone strict inspection about "shape deterioration" and "tape adhesion" are preferably used. Also, in the ATM, banknotes as good bills which have undergone strict inspection about "blurring" are preferably used. By contrast, it is considered that necessity of strict discrimination associated with "contamination" is low in the ATM.

That is, according to the third setting example, when sheets are to be strictly discriminated in association with one or a plurality of detection items according to the operation form, reference levels that match the operation form desired by the user can be easily set by designating bad bill ratios (or good bill ratios) and priority levels for the respective detection items.

FIG. 17 shows a setting example (fourth setting example) of one or a plurality of detection items, reference levels of which are fixed, and a detection item, a bad bill ratio of which is set.

In the fourth setting example shown in FIG. 17, a total bad bill ratio is set to be 30%. Also, in the fourth setting example shown in FIG. 17, reference levels are directly set for "shape", "tape", and "blurring" in place of bad bill ratios, and a bad bill ratio of 30% or less is set for "contamination". Furthermore, in the fourth setting example shown in FIG. 17, a good/bad state is preferentially discriminated for "shape", "tape", and "blurring", the reference levels of which are directly set. In this case, sheets which are discriminated as good bills in association with "shape", "tape", and "blurring" undergo good/bad discrimination about "contamination".

In other words, the fourth setting example discriminates good/bad states for specific detection items using the directly designated reference levels, and adjusts bad bill ratios for the remaining detection items so as to attain the setting value of the total bad bill ratio. For example, in the fourth setting example shown in FIG. 17, good/bad discrimination is executed using the designated reference levels in association with "shape", "tape", and "blurring". For this reason, bad bill ratios are indeterminate in the good/bad discrimination in association with "shape", "tape", and "blurring".

However, bad bill ratios obtained in correspondence with the reference levels can be estimated from the aforementioned previous processing results. For example, from the data shown in FIG. 8, the bad bill ratios corresponding to the reference levels can be estimated. That is, the CPU 21 of the teller PC 2 decides a reference level for "contamination" to attain a total bad bill ratio=30% with reference to the bad bill ratios obtained in correspondence with the reference levels designated for "shape", "tape", and "blurring".

For example, when the bad bill ratios obtained in correspondence with the reference levels designated for "shape", "tape", and "blurring" are respectively 2%, 2%, and 16%, if a ratio of redundantly discriminating bad bills in the items "shape", "tape", and "blurring" and the item "contamination" is about 50%, it is estimated that the total bad bill ratio becomes 30% ((2+2+16)/2+20=30) when the bad bill ratio associated with "contamination" is adjusted to be about 20%. Such adjustment of the bad bill ratio corresponding to the fourth setting example is executed by, for example, the CPU 21 of the teller PC 2 with reference to the data stored in the data storage unit 24. After the bad bill ratio for the detection item, a reference level of which is not designated, is decided, the CPU 21 of the teller PC 2 sets a reference level according to the decided bad bill ratio in that detection item. For the detection items, the reference levels of which are designated, the CPU 21 of the teller PC 2 sets the designated reference levels.

The aforementioned fourth setting example is effective to a case in which the good/bad state is discriminated for specific detection items using given reference levels, and the total bad bill ratio becomes that desired by the user. For example, it is considered that an apparatus such as an automatic teller machine (ATM) has recommended values for the states of sheets to be loaded so as to prevent any convey abnormality in the apparatus. Sheets which satisfy these recommended values can be reliably discriminated by discriminating their good/bad states using predetermined reference levels in the sheet processing machine 3. That is, according to the fourth setting example, settings that allow to surely discriminate sheets which satisfy predetermined reference levels, and to implement processing which can attain a bad bill ratio (or good bill ratio) desired by the user can be easily realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sheet processing apparatus for executing sorting processing of sheets, comprising:

an operation unit which is used to input a ratio of good bills or bad bills;

a data storage unit which stores data indicating a ratio of good bills or bad bills with respect to a reference value used to discriminate whether a sheet is a good bill or a bad bill;

a decision unit which decides a reference value that attains the ratio inputted by the operation unit based on the data stored in the data storage unit;

a pick-up unit which sequentially picks up sheets set in a feeder unit;

a convey unit which conveys the sheet picked up by the pick-up unit;

a discrimination unit which detects a degree of contamination/damage on the sheet conveyed by the convey unit, and discriminates whether the sheet is a good bill or a bad bill by comparing the detected degree of contamination/damage with the reference value decided by the decision unit; and a stacking unit which comprises a first stacker that stacks sheets discriminated as good bills by the discrimination unit and a second stacker that stacks sheets discriminated as bad bills by the discrimination unit.

2. The sheet processing apparatus according to claim 1, wherein the data storage unit stores data including information indicating degrees of contamination/damage of processed sheets as discrimination results by the discrimination unit.

3. The sheet processing apparatus according to claim 1, wherein the discrimination unit detects degrees of contamination or damage for a plurality of detection items, and the decision unit decides reference values for the respective detection items to attain the designated ratio.

4. The sheet processing apparatus according to claim 1, wherein the discrimination unit detects degrees of contamination or damage for a plurality of detection items, and the decision unit decides reference values for the respective detection items so that good/bad discrimination results in the respective detection items attain ratios individually designated for the respective detection items.

5. The sheet processing apparatus according to claim 1, wherein the discrimination unit detects degrees of contamination or damage for a plurality of detection items, and when ratios of good bills or bad bills and priority levels are designated for the respective detection items, and when a ratio of good bills or bad bills in overall processing is designated, the decision unit decides a reference values for the detection item with the higher priority level so that a good/bad discrimination result in the detection item attains the ratio designated for the detection item, and decides a reference value for the detection item with the lower priority level so that the ratio in the overall processing attains the designated ratio based on a good/bad discrimination result in the detection item.

6. The sheet processing apparatus according to claim 1, wherein the discrimination unit detects a shape deterioration on a sheet as one of a plurality of detection items, and the decision unit preferentially decides a reference value for the shape deterioration so as to attain a ratio designated for that detection item, and decides reference values for other detection items so that a ratio in the overall processing attains a designated ratio.

7. The sheet processing apparatus according to claim 1, wherein the discrimination unit detects a tape adhered to a sheet as one of a plurality of detection items, and the decision unit preferentially decides a reference value for the tape detection so as to attain a ratio designated for that detection item, and decides reference values for other detection items so that a ratio in the overall processing attains a designated ratio.

8. The sheet processing apparatus according to claim 1, wherein the discrimination unit detects print blurring on a sheet as one of a plurality of detection items, and the decision unit preferentially decides a reference value for the blurring detection so as to attain a ratio designated for that detection item, and decides reference values for other detection items so that a ratio in the overall processing attains a designated ratio.

9. The sheet processing apparatus according to claim 1, wherein the discrimination unit detects degrees of contamination or damage for a plurality of detection items, and when a reference value is designated for a specific detection item, the decision unit decides reference values for other detection items so that a ratio of good bills or bad bills in overall processing attains a designated ratio.

10. A sheet processing method for executing sorting processing of sheets, comprising:

acquiring a ratio of good bills or bad bills inputted by an operation unit;

storing, in a storage unit, data indicating a ratio of good bills or bad bills with respect to a reference value used to discriminate whether a sheet is a good bill or a bad bill;

deciding a reference value that attains the ratio inputted by the operation unit based on the data stored in the data storage unit;

sequentially picking up sheets;

conveying the picked-up sheet;

detecting a degree of contamination/damage on the conveyed sheet;

discriminating whether the sheet is a good bill or a bad bill by comparing the detected degree of contamination/damage with the decided reference value;

stacking, in a first stacker, sheets discriminated as good bills in discriminating; and stacking, in a second stacker, sheets discriminated as bad bills in discriminating.

11. A sheet processing apparatus for executing sorting processing of sheets, comprising:

a data storage unit which stores data indicating a ratio of good bills or bad bills with respect to a reference value used to discriminate whether a sheet is a good bill or a bad bill;

a decision unit which decides, if the ratio of good bills or bad bills is designated, a reference value which attains the designated ratio based on the data stored in the data storage unit;

a pick up unit which sequentially picks up sheets set in a feeder unit;

a convey unit which conveys the sheet picked up by the pick up unit;

a discrimination unit which detects a degree of contamination/damage on the sheet conveyed by the convey unit, and discriminates whether the sheet is a good bill or a bad bill by comparing the detected degree of contamination/damage with the reference value decided by the decision unit; and a stacking unit which comprises a first stacker that stacks sheets discriminated as good bills by the discrimination unit and a second stacker that stacks sheets discriminated as bad bills by the discrimination unit, wherein the discrimination unit detects degrees of contamination or damage for a plurality of detection items, and if a reference value is designated for a specific detection item, the decision unit decides reference values for other detection items so that a ratio of good bills or bad bills in overall processing attains a designated ratio.

* * * * *